(12) United States Patent
Sakamaki et al.

(10) Patent No.: US 8,813,902 B2
(45) Date of Patent: Aug. 26, 2014

(54) HYDRAULIC POWER STEERING SYSTEM

(71) Applicant: JTEKT Corporation, Osaka (JP)

(72) Inventors: Masahiko Sakamaki, Yao (JP); Keisuke Izutani, Yamatotakada (JP)

(73) Assignee: JTEKT Corporation, Osaka (JP)

( * ) Notice: Subject to any disclaimer, the term of this patent is extended or adjusted under 35 U.S.C. 154(b) by 99 days.

(21) Appl. No.: 13/719,484

(22) Filed: Dec. 19, 2012

(65) Prior Publication Data

US 2013/0161113 A1    Jun. 27, 2013

(30) Foreign Application Priority Data

Dec. 26, 2011   (JP) ................................ 2011-283727

(51) Int. Cl.
*B62D 5/09*     (2006.01)
*B62D 5/065*    (2006.01)

(52) U.S. Cl.
CPC . *B62D 5/065* (2013.01); *B62D 5/09* (2013.01)
USPC ........................................................ 180/422

(58) Field of Classification Search
USPC ............. 180/417, 420, 421, 422, 441; 704/41
See application file for complete search history.

(56) References Cited

U.S. PATENT DOCUMENTS

| | | | | |
|---|---|---|---|---|
| 4,771,845 A * | 9/1988 | Shimizu | ......................... | 180/446 |
| 6,158,545 A * | 12/2000 | Kaji et al. | ...................... | 180/446 |
| 6,161,069 A * | 12/2000 | Fujita | ............................... | 701/41 |
| 6,619,422 B2 * | 9/2003 | Takeuchi et al. | .............. | 180/446 |
| 7,730,993 B2 * | 6/2010 | Watanabe | ...................... | 180/422 |

FOREIGN PATENT DOCUMENTS

JP    A-2006-306239    11/2006

* cited by examiner

*Primary Examiner* — Tony Winner
(74) *Attorney, Agent, or Firm* — Oliff PLC

(57) ABSTRACT

When an ECU is powered on, an overall control unit determines whether a temperature detected by a temperature sensor is lower than or equal to a predetermined temperature. When it is determined that the detected temperature is lower than or equal to the predetermined temperature, the overall control unit provides a second operation start command for operating a valve driving motor control unit in a rotation direction alternately switching mode, to the valve driving motor control unit. When the valve driving motor control unit receives the second operation start command from the overall control unit, the valve driving motor control unit starts operating in the rotation direction alternately switching mode.

4 Claims, 6 Drawing Sheets

HYDRAULIC POWER STEERING SYSTEM

INCORPORATION BY REFERENCE/RELATED APPLICATION

This application claims priority to Japanese Patent Application No. 2011-283727 filed on Dec. 26, 2011 the disclosure of which, including the specification, drawings and abstract, is incorporated herein by reference in its entirety.

BACKGROUND OF THE INVENTION

1. Field of the Invention

The invention relates to a hydraulic power steering system.

2. Discussion of Background

There is a conventional hydraulic power steering system that generates steering assist force by supplying hydraulic fluid from a hydraulic pump to a power cylinder, which is coupled to a steering mechanism of a vehicle, via a hydraulic control valve. In a commonly-used hydraulic power steering system, a hydraulic control valve is mechanically coupled to a steering member, such as a steering wheel, via a steering shaft, and the opening degree of the hydraulic control valve is controlled in response to an operation of the steering member.

Japanese Patent Application Publication No. 2006-306239 (JP 2006-306239 A) describes a hydraulic power steering system in which the opening degree of a hydraulic control valve is controlled with the use of an electric motor (valve driving motor) without mechanical coupling between the hydraulic control valve and a steering member.

In the hydraulic power steering system in which the opening degree of the hydraulic control valve is controlled by the valve driving motor, when the ambient temperature of the hydraulic control valve is low, the viscosity of hydraulic fluid inside the hydraulic control valve becomes high or the friction of an oil seal inside the hydraulic control valve becomes large. As a result, motor torque of the valve driving motor becomes insufficient, leading to reduction in response of the hydraulic control valve to the opening degree control. This causes deterioration of the steering feel.

SUMMARY OF THE INVENTION

The invention provides a hydraulic power steering system that is able to avoid reduction in response of a hydraulic control valve to opening degree control at low temperatures, thereby improving the steering feel.

According to a feature of an example of the invention, when a temperature detected by temperature detecting means is lower than or equal to a predetermined value, a valve driving motor is rotated alternately in a forward direction and a reverse direction for a predetermined period of time. Thus, the temperature of hydraulic fluid in a hydraulic control valve increases, and the viscosity of hydraulic fluid and the friction resistance of an oil seal are reduced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
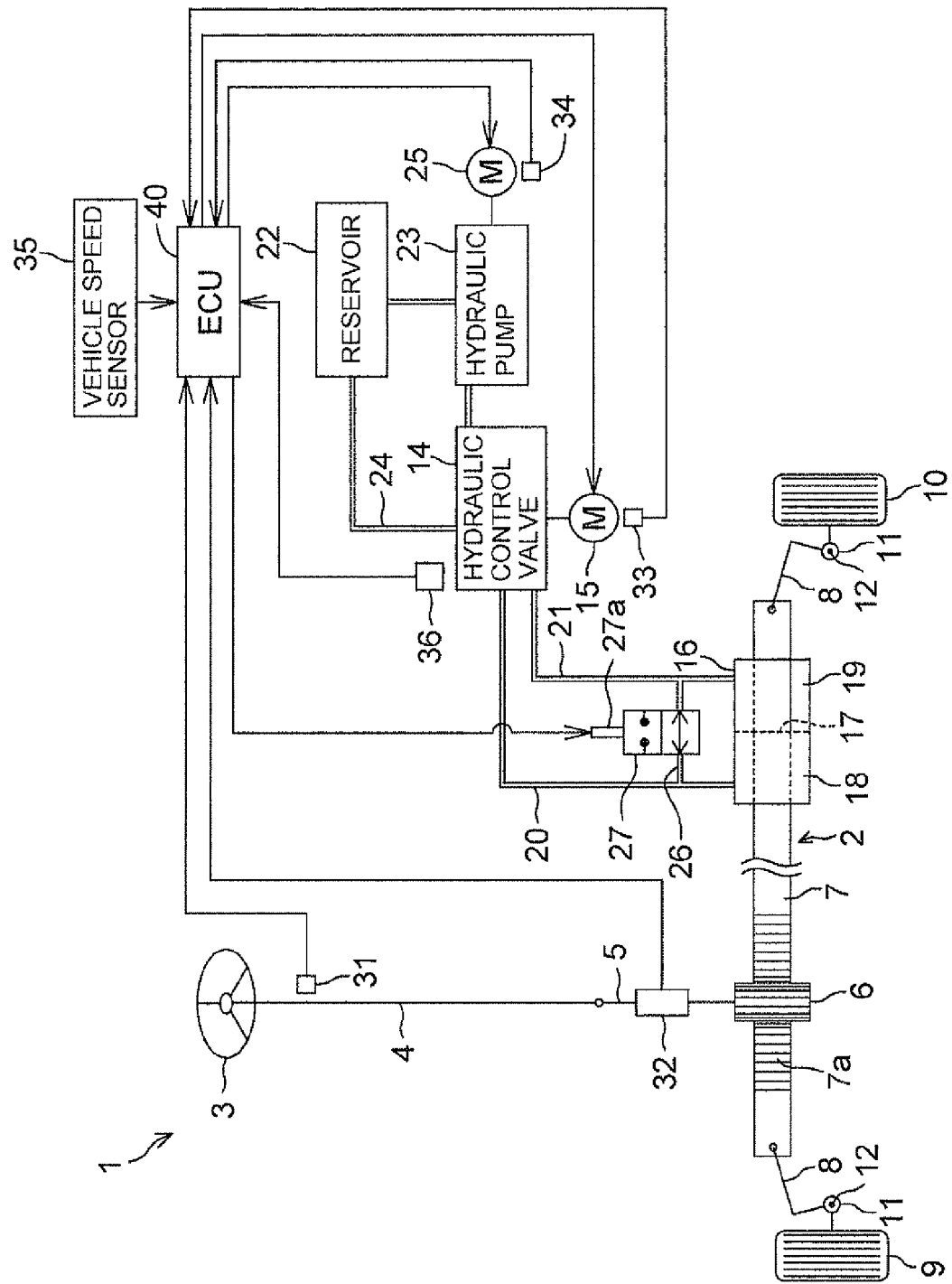
FIG. 1 is a schematic view that shows the schematic configuration of a hydraulic power steering system according to an embodiment of the invention.

FIG. 1 shows the schematic configuration of a hydraulic power steering system 1 according to an embodiment of the invention. The hydraulic power steering system 1 applies steering assist force to a steering mechanism 2 of a vehicle. The steering mechanism 2 includes a steering wheel 3, a steering shaft 4, a pinion shaft 5 and a rack shaft 7. The steering wheel 3 serves as a steering member, and is operated by a driver in order to steer the vehicle. The steering shaft 4 is coupled to the steering wheel 3. The pinion shaft 5 is coupled to the distal end portion of the steering shaft 4, and has a pinion gear 6. The rack shaft 7 has a rack 7a that is in mesh with the pinion gear 6, and serves as a steered shaft that extends in the lateral direction of the vehicle.

Tie rods 8 are coupled to respective ends of the rack shaft 7. The tie rods 8 are coupled to knuckle arms 11 that respectively support right and left steered wheels 9, 10. Each of the knuckle arms 11 is provided so as to be pivotable about a corresponding one of kingpins 12. When the steering wheel 3 is operated to rotate the steering shaft 4, the rotation is converted by the pinion gear 6 and the rack 7a into a linear motion along the axial direction of the rack shaft 7. The linear motion is converted into a pivot motion of each knuckle arm 11 about the corresponding kingpin 12. As a result, the right and left steered wheels 9, 10 are steered.

A steering angle sensor 31 is arranged around the steering shaft 4. The steering angle sensor 31 is used to detect a steering angle θh that is the rotation angle of the steering shaft 4. In the present embodiment, the steering angle sensor 31 is used to detect a rotation amount (rotation angle) of the steering shaft 4 in each of the forward and reverse directions from the neutral position of the steering shaft 4. The steering angle sensor 31 outputs an amount of rotation to the left from the neutral position as a positive value, and outputs an amount of rotation to the right from the neutral position as a negative value. A torque sensor 32 is provided on the pinion shaft 5. The torque sensor 32 is used to detect a steering torque Th.

The hydraulic power steering system 1 includes a hydraulic control valve 14, a bypass valve 27, a power cylinder 16 and a hydraulic pump 23. The hydraulic control valve 14 is, for example, a rotary valve, and includes a rotor housing (not shown) and a rotor (not shown) that is used to change the direction in which hydraulic fluid flows. The opening degree of the hydraulic control valve 14 is controlled by rotating the rotor of the hydraulic control valve 14 with the use of a valve driving motor 15. The valve driving motor 15 is formed of a three-phase brushless motor. A rotation angle sensor 33 is arranged near the valve driving motor 15. The rotation angle sensor 33 is formed of, for example, a resolver, and is used to detect a rotation angle θB of a rotor of the valve driving motor 15.

The hydraulic control valve 14 is connected to the power cylinder 16 that applies steering assist force to the steering mechanism 2. The power cylinder 16 is coupled to the steering mechanism 2. Specifically, the power cylinder 16 has a piston 17, and a pair of cylinder chambers 18, 19. The piston 17 is provided integrally with the rack shaft 7. The cylinder chambers 18, 19 are defined by the piston 17. The cylinder chambers 18, 19 are connected to the hydraulic control valve 14 via fluid passages 20, 21, respectively.

The hydraulic control valve 14 is arranged on a fluid circulation passage 24 that passes through a reservoir 22 and the hydraulic pump 23 that is used to generate steering assist force. The hydraulic pump 23 is formed of, for example, a gear pump. The hydraulic pump 23 is driven by an electric motor 25 (hereinafter, referred to as "pump driving motor 25") to draw the hydraulic fluid stored in the reservoir 22 and supply the hydraulic fluid to the hydraulic control valve 14. Excess hydraulic fluid is returned from the hydraulic control valve 14 to the reservoir 22 via the fluid circulation passage 24. A temperature sensor 36 is arranged near the hydraulic control valve 14. The temperature sensor 36 is used to detect an ambient temperature of the hydraulic control valve 14.

The bypass valve 27 is formed of a normally open electromagnetic valve, and includes a solenoid 27a. The bypass valve 27 is arranged at a middle portion of a bypass passage 26 that connects the fluid passage 20 and the fluid passage 21 to each other. When no current is supplied to the solenoid 27a (during de-energization), the bypass valve 27 is open (the bypass passage 26 is open); whereas, when current is supplied to the solenoid 27a (during energization), the bypass valve 27 is closed (the bypass passage 26 is closed). The bypass valve 27 is provided in order to ensure steering by an operation of the steering wheel 3, by providing communication between the cylinder chambers 18, 19 when supply of electric power to an ECU 40 (described later) is stopped due to some abnormality. Usually, the bypass valve 27 is closed immediately after the ECU 40 is powered on.

The pump driving motor 25 is driven to rotate in one direction to thereby drive the hydraulic pump 23. Specifically, the output shaft of the pump driving motor 25 is coupled to the input shaft of the hydraulic pump 23. When the output shaft of the pump driving motor 25 rotates, the input shaft of the hydraulic pump 23 rotates and the hydraulic pump 23 is driven. The pump driving motor 25 is formed of a three-phase brushless motor. A rotation angle sensor 34 is arranged near the pump driving motor 25. The rotation angle sensor 34 is formed of, for example, a resolver, and is used to detect a rotation angle θP of a rotor of the pump driving motor 25.

When the rotor of the hydraulic control valve 14 is rotated by the valve driving motor 15 in one direction from a reference rotation angular position (neutral position), the hydraulic control valve 14 supplies the hydraulic fluid to one of the cylinder chambers 18, 19 of the power cylinder 16 via a corresponding one of the fluid passages 20, 21, and returns the hydraulic fluid in the other one of the cylinder chambers 18, 19 to the reservoir 22. When the rotor of the hydraulic control valve 14 is rotated by the valve driving motor 15 in the other direction from the neutral position, the hydraulic control valve 14 supplies the hydraulic fluid to the other one of the cylinder chambers 18, 19 via the other one of the fluid passages 20, 21, and returns the hydraulic fluid in the one of the cylinder chambers 18, 19 to the reservoir 22.

When the rotor of the hydraulic control valve 14 is at the neutral position, the hydraulic control valve 14 is in a balanced state. Therefore, both the cylinder chambers 18, 19 of the power cylinder 16 are kept at an equal pressure, and the hydraulic fluid circulates through the fluid circulation passage 24. When the rotor of the hydraulic control valve 14 is rotated by the valve driving motor 15, the hydraulic fluid is supplied to one of the cylinder chambers 18, 19 of the power cylinder 16, and the piston 17 moves in the vehicle width direction (the lateral direction of the vehicle). As a result, steering assist force acts on the rack shaft 7.

The valve driving motor 15, the solenoid 27a of the bypass valve 27 and the pump driving motor 25 are controlled by the ECU 40. The steering angle θh that is detected by the steering angle sensor 31, the steering torque Th that is detected by the torque sensor 32, a signal that is output from the rotation angle sensor 33, a signal that is output from the rotation angle sensor 34, the ambient temperature T that is detected by the temperature sensor 36, a vehicle speed V that is detected by a vehicle speed sensor 35, a signal that is output from a current sensor 38 (see FIG. 2) used to detect a current that flows through the valve driving motor 15, and the like, are input into the ECU 40.

Figure 2:
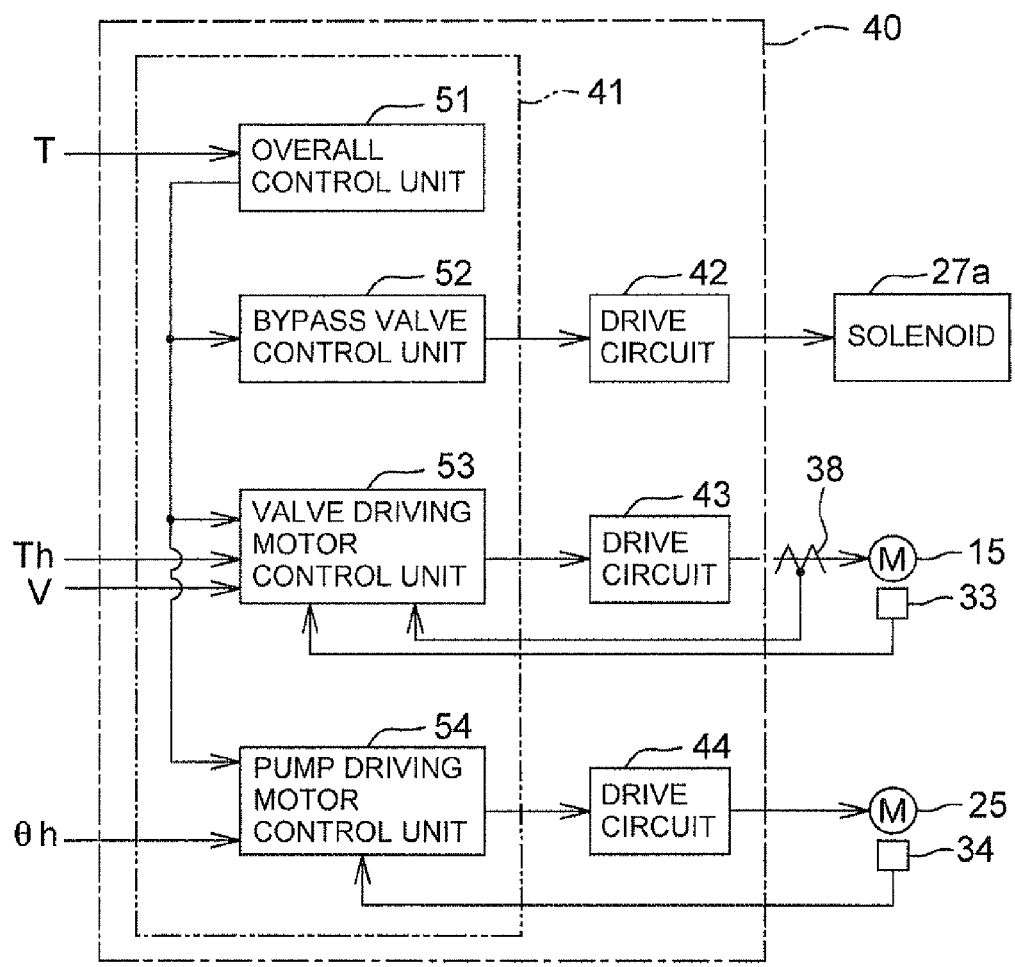
FIG. 2 is a block diagram that shows the electrical configuration of an ECU.

FIG. 2 is a block diagram that shows the electrical configuration of the ECU 40. The ECU 40 includes a microcomputer 41, a drive circuit 42, a drive circuit (inverter circuit) 43, and a drive circuit (inverter circuit) 44. The drive circuit 42 supplies electric power to the solenoid 27a of the bypass valve 27. The drive circuit 43 supplies electric power to the valve driving motor 15. The drive circuit 44 supplies electric power to the pump driving motor 25. The drive circuits 42, 43, 44 are controlled by the microcomputer 41. The current sensor 38 is provided on a power supply line that connects the drive circuit 43 to the valve driving motor 15.

The microcomputer 41 includes a CPU and memories (a ROM, a RAM, and the like), and executes predetermined programs to function as a plurality of functional processing units. The functional processing units include an overall control unit 51, a bypass valve control unit 52, a valve driving motor control unit 53, and a pump driving motor control unit 54. The bypass valve control unit 52 is used to control the solenoid 27a of the bypass valve 27 via the drive circuit 42. The valve driving motor control unit 53 is used to control the valve driving motor 15 via the drive circuit 43. The pump driving motor control unit 54 is used to control the pump driving motor 25 via the drive circuit 44.

The overall control unit 51 controls the bypass valve control unit 52, the valve driving motor control unit 53 and the pump driving motor control unit 54. The operation of the overall control unit 51 will be described later in detail. The bypass valve control unit 52 controls the open/close states of the bypass valve 27 on the basis of a command from the overall control unit 51. The operation modes of the valve driving motor control unit 53 include a normal mode and a rotation direction alternately switching mode. The normal mode is selected to achieve steering assist corresponding to the steering state. The rotation direction alternately switching mode is selected to increase the temperature of the hydraulic fluid in the hydraulic control valve 14. In the normal mode, the valve driving motor control unit 53 controls the valve driving motor 15 on the basis of the steering torque Th that is detected by the torque sensor 32 and the vehicle speed V that is detected by the vehicle speed sensor 35. On the other hand, in the rotation direction alternately switching mode, the valve driving motor control unit 53 rotates the valve driving motor 15 alternately in the forward direction and the reverse direction for a predetermined period of time. The operation mode is changed by the overall control unit 51. The operation of the valve driving motor control unit 53 will be described later in detail.

The pump driving motor control unit 54 controls the pump driving motor 25 on the basis of the steering angle θh that is detected by the steering angle sensor 31. The operation of the pump driving motor control unit 54 will be described later in detail.

Figure 3:
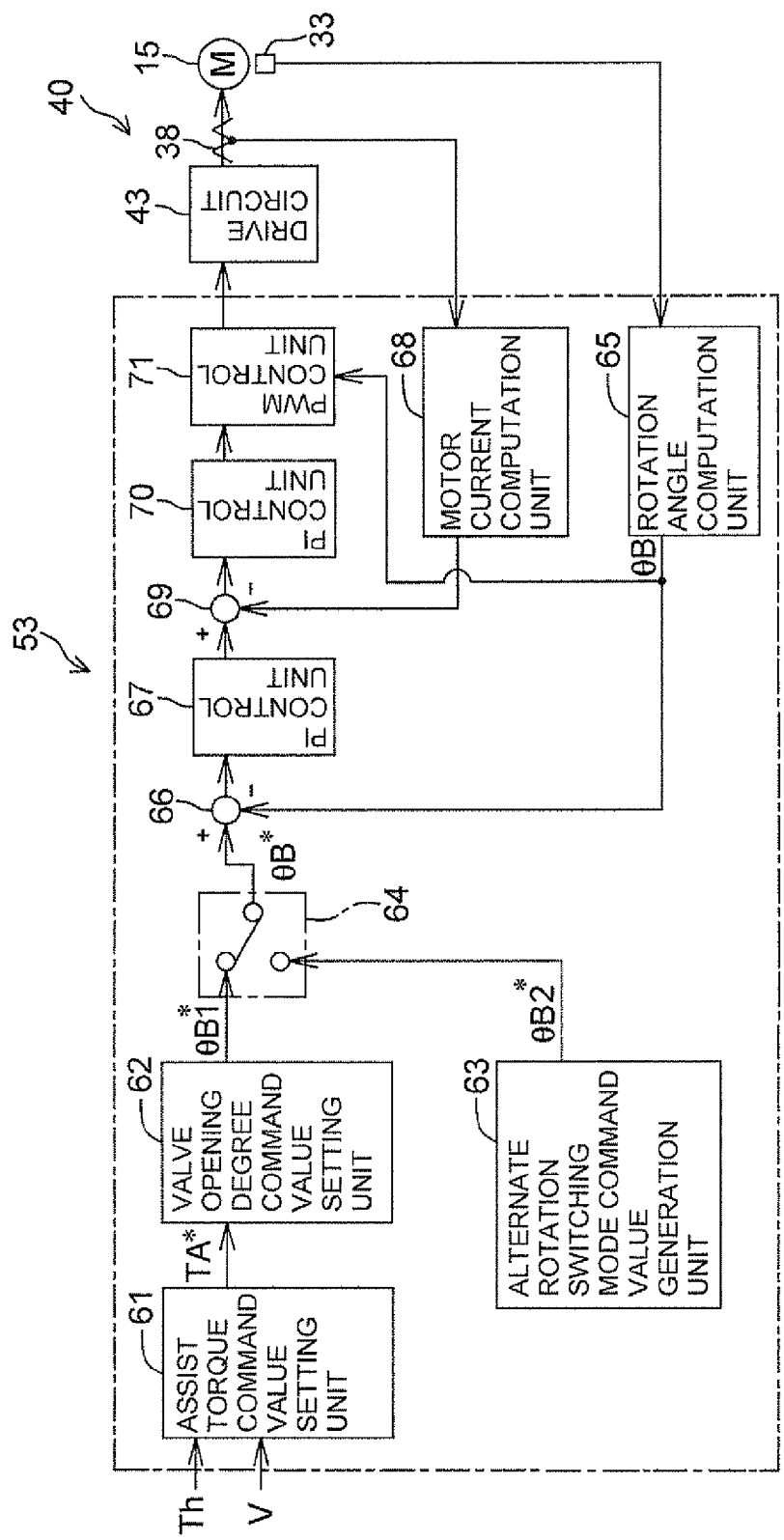
FIG. 3 is a block diagram that shows the configuration of a valve driving motor control unit.

FIG. 3 is a block diagram that shows the configuration of the valve driving motor control unit 53. The valve driving motor control unit 53 includes an assist torque command value setting unit 61, a valve opening degree command value setting unit 62, a rotation direction alternately switching mode command value generation unit 63, a command value selection unit 64, a rotation angle computation unit 65, a rotation angular deviation computation unit 66, a PI control unit 67, a motor current computation unit 68, a current deviation computation unit 69, a PI control unit 70 and a PWM control unit 71.

The assist torque command value setting unit 61 sets an assist torque command value TA* on the basis of the detected steering torque Th that is detected by the torque sensor 32 and the vehicle speed V that is detected by the vehicle speed sensor 35. The assist torque command value TA* is a command value of assist torque that should be generated by the power cylinder 16. Specifically, the assist torque command value setting unit 61 sets the assist torque command value TA* on the basis of a map that stores the correlation between the detected steering torque and the assist torque command value for each vehicle speed.

Figure 4:
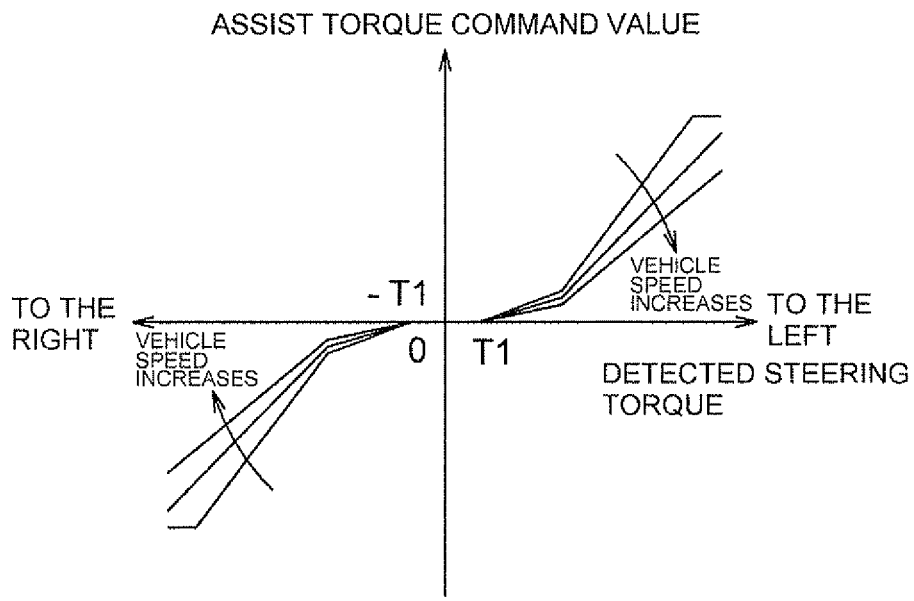
FIG. 4 is a graph that shows an example of a manner of setting an assist torque command value with respect to a detected steering torque.

FIG. 4 is a graph that shows an example of a manner of setting the assist torque command value with respect to the detected steering torque. The detected steering torque Th is expressed, for example, such that torque for steering to the left takes a positive value and torque for steering to the right takes a negative value. In addition, the assist torque command value TA* takes a positive value when assist torque for steering to the left is generated by the power cylinder 16, and takes a negative value when assist torque for steering to the right is generated by the power cylinder 16.

The assist torque command value TA* with respect to a positive value of the detected steering torque Th takes a positive value, and the assist torque command value TA* with respect to a negative value of the detected steering torque Th takes a negative value. When the detected steering torque Th is a small value that falls within the range of −T1 to T1, the assist torque command value TA* is set to zero. When the detected steering torque Th falls outside the range of −T1 to T1, the assist torque command value TA* is set such that the absolute value of the assist torque command value TA* increases as the absolute value of the detected steering torque Th increases. In addition, the assist torque command value TA* is set such that the absolute value of the assist torque command value TA* decreases as the vehicle speed V detected by the vehicle speed sensor 35 increases. The assist torque command value TA* set by the assist torque command value setting unit 61 is provided to the valve opening degree command value setting unit 62.

The valve opening degree command value setting unit 62 sets a first valve opening degree command value (motor rotation angle command value) θB1* on the basis of the assist torque command value TA* provided from the assist torque command value setting unit 61. The first valve opening degree command value θB1* is a command value of the opening degree of the hydraulic control valve 14 (command value of the rotation angle of the valve driving motor 15). In the present embodiment, the rotation angle of the valve driving motor 15 at the time when the rotor of the hydraulic control valve 14 is at the neutral position is zero degrees (0°). When the rotation angle of the valve driving motor 15 is larger than 0°, the opening degree of the hydraulic control valve 14 is controlled such that assist torque for steering to the left is generated is generated by the power cylinder 16. On the other hand, when the rotation angle of the valve driving motor 15 is smaller than 0°, the opening degree of the hydraulic control valve 14 is controlled such that assist torque for steering to the right is generated by the power cylinder 16. Note that, as the absolute value of the rotation angle of the valve driving motor 15 increases, the absolute value of assist torque that is generated by the power cylinder 16 increases.

Figure 5:
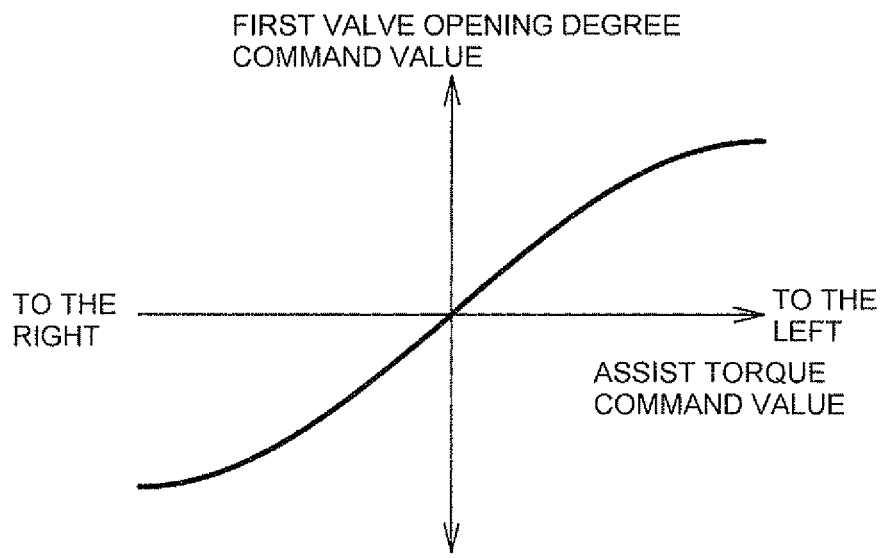
FIG. 5 is a graph that shows an example of a manner of setting a first valve opening degree command value with respect to an assist torque command value.

The valve opening degree command value setting unit 62 sets the first valve opening degree command value θB1* on the basis of a map that stores the correlation between the assist torque command value TA* and the first valve opening degree command value θB1*. FIG. 5 is a graph that shows an example of a manner of setting the first valve opening degree command value θB1* with respect to the assist torque command value TA*. The first valve opening degree command value θB1* with respect to a positive value of the assist torque command value TA* takes a positive value, and the first valve opening degree command value θB1* with respect to a negative value of the assist torque command value TA* takes a negative value. The first valve opening degree command value θB1* is set such that the absolute value of the first valve opening degree command value θB1* increases as the absolute value of the assist torque command value TA* increases. The first valve opening degree command value θB1* set by the valve opening degree command value setting unit 62 is provided to the command value selection unit 64.

The rotation direction alternately switching mode command value generation unit 63 generates a second valve opening degree command value θB2* that is used to rotate the valve driving motor 15 alternately in the forward direction and the reverse direction. The rotation direction alternately switching mode command value generation unit 63 generates the second valve opening degree command value θB2*, for example, in the following manner. A change pattern of the valve opening degree command value, which is used to rotate the valve driving motor 15 alternately in the forward direction and the reverse direction, is stored in the ROM in advance. The rotation direction alternately switching mode command value generation unit 63 generates the second valve opening degree command value θB2* by sequentially reading data that constitute the change pattern from the ROM at predetermined computation intervals. The second valve opening degree command value θB2* generated by the rotation direction alternately switching mode command value generation unit 63 is provided to the command value selection unit 64.

The command value selection unit 64 selects one of the first valve opening degree command value θB1* and the second valve opening degree command value θB2*, and outputs the selected one as a valve opening degree command value θB*. Specifically, in the normal mode, the command value selection unit 64 selects the first valve opening degree command value θB1*, and outputs the first valve opening degree command value θB1* as the valve opening degree command value θB*. On the other hand, in the rotation direction alternately switching mode, the command value selection unit 64 selects the second valve opening degree command value θB2*, and outputs the second valve opening degree command value θB2* as the valve opening degree command value θB*. The valve opening degree command value θB* output from the command value selection unit 64 is provided to the rotation angular deviation computation unit 66.

The rotation angle computation unit 65 computes the rotation angle θB of the valve driving motor 15 on the basis of a signal that is output from the rotation angle sensor 33. The rotation angle θB computed by the rotation angle computation unit 65 is provided to the rotation angular deviation computation unit 66. The rotation angular deviation computation unit 66 computes a deviation ΔθB(=θB*−θB) between the valve opening degree command value θB* output from the command value selection unit 64 and the rotation angle θB computed by the rotation angle computation unit 65.

The PI control unit 67 carries out PI computation on the rotation angular deviation ΔθB computed by the rotation angular deviation computation unit 66. That is, the rotation angular deviation computation unit 66 and the PI control unit 67 constitute rotation angle feedback control means for bringing the rotation angle θB of the valve driving motor 15 to the valve opening degree command value θB*. The PI control unit 67 carries out PI computation on the rotation angular deviation ΔθB to compute a current command value for the valve driving motor 15.

The motor current computation unit 68 detects a motor current that flows through the valve driving motor 15 on the basis of a signal that is output from the current sensor 38. The current deviation computation unit 69 computes a deviation between the current command value obtained by the PI control unit 67 and the motor current computed by the motor current computation unit 68. The PI control unit 70 carries out PI computation on the current deviation computed by the current deviation computation unit 69. That is, the current deviation computation unit 69 and the PI control unit 70 constitute current feedback control means for bringing the motor current that flows through the valve driving motor 15 to the current command value. The PI control unit 70 carries out PI computation on the current deviation to compute a control voltage value, which is a value of the control voltage that should be applied to the valve driving motor 15.

The PWM control unit 71 generates a drive signal on the basis of the control voltage value computed by the PI control unit 70 and the rotation angle θB of the valve driving motor 15, which is computed by the rotation angle computation unit 65, and provides the drive signal to the drive circuit 43. As a result, a voltage that corresponds to the control voltage value computed by the PT control unit 70 is applied from the drive circuit 43 to the valve driving motor 15.

Figure 6:
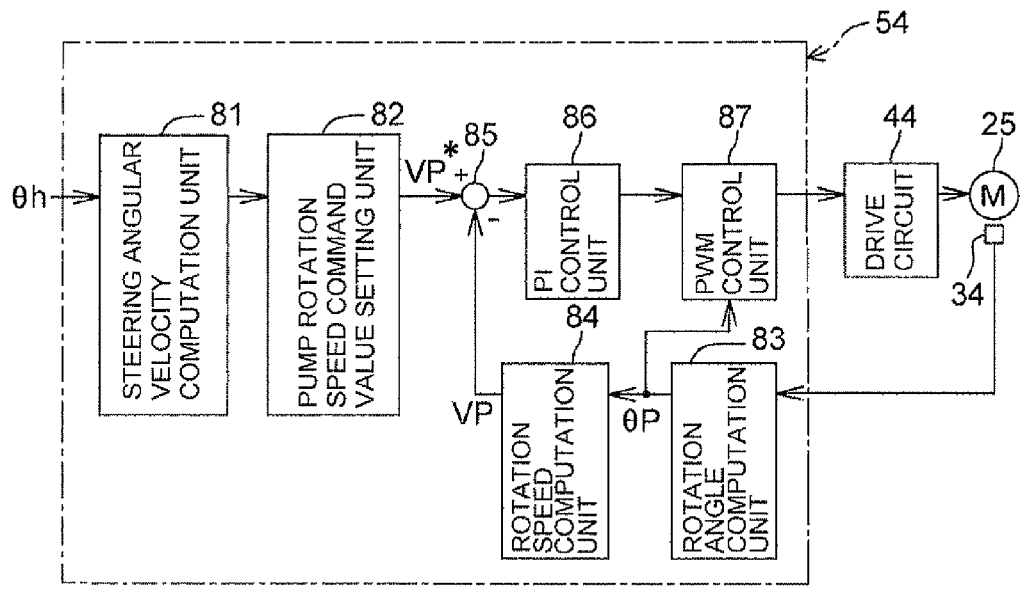
FIG. 6 is a block diagram that shows the configuration of a pump driving motor control unit.

FIG. 6 is a block diagram that shows the configuration of the pump driving motor control unit 54. The pump driving motor control unit 54 includes a steering angular velocity computation unit 81, a pump rotation speed command value setting unit 82, a rotation angle computation unit 83, a rotation speed computation unit 84, a rotation speed deviation computation unit 85, a PI control unit 86 and a PWM control unit 87. The steering angular velocity computation unit 81 subjects a value output from the steering angle sensor 31 to temporal differentiation to compute a steering angular velocity. The pump rotation speed command value setting unit 82 sets a pump rotation speed command value (motor rotation speed command value) VP* that is a command value of the rotation speed (number of revolutions) of the hydraulic pump 23 (a command value of the rotation speed of the pump driving motor 25) on the basis of the steering angular velocity ωh computed by the steering angular velocity computation unit 81.

Figure 7:
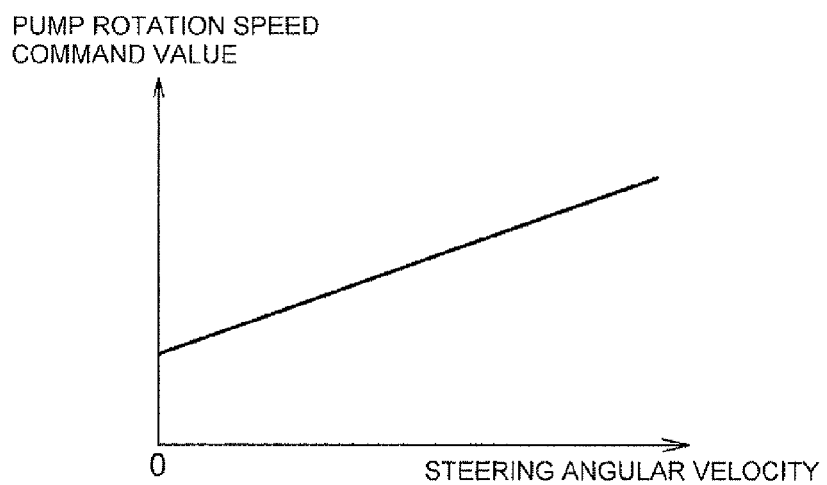
FIG. 7 is a graph that shows an example of a manner of setting a pump rotation speed command value with respect to a steering angular velocity.

Specifically, the pump rotation speed command value setting unit 82 sets the pump rotation speed command value VP* on the basis of a map that stores the correlation between the steering angular velocity and the pump rotation speed command value VP*. FIG. 7 is a graph that shows an example of a manner of setting the pump rotation speed command value VP* with respect to the steering angular velocity ωh. The pump rotation speed command value VP* is set such that the pump rotation speed command value VP* takes a predetermined lower limit when the steering angular velocity is zero and the pump rotation speed command value VP* monotonously increases with an increase in the steering angular velocity.

The rotation angle computation unit 83 computes a rotation angle θP of the pump driving motor 25 on the basis of a signal that is output from the rotation angle sensor 34. The rotation speed computation unit 84 computes a rotation speed (number of revolutions) VP of the pump driving motor 25 on the basis of the rotation angle θP of the pump driving motor 25, which is computed by the rotation angle computation unit 83. The rotation speed deviation computation unit 85 computes a deviation ΔVP(=VP*−VP) between the pump rotation speed command value VP* set by the pump rotation speed command value setting unit 82 and the rotation speed VP of the pump driving motor 25, which is computed by the rotation speed computation unit 84.

The PI control unit 86 carries out PI computation on the rotation speed deviation ΔVP computed by the rotation speed deviation computation unit 85. That is, the rotation speed deviation computation unit 85 and the PI control unit 86 constitute rotation speed feedback control means for bringing the rotation speed VP of the pump driving motor 25 to the pump rotation speed command value VP*. The PI control unit 86 carries out PI computation on the rotation speed deviation ΔVP to thereby compute a control voltage value, which is a value of the voltage that should be applied to the pump driving motor 25.

The PWM control unit 87 generates a drive signal on the basis of the control voltage value computed by the PI control unit 86 and the rotation angle θP of the pump driving motor 25, which is computed by the rotation angle computation unit 83, and supplies the drive signal to the drive circuit 44. As a result, a voltage that corresponds to the control voltage value computed by the PI control unit 86 is applied from the drive circuit 44 to the pump driving motor 25.

Figure 8:
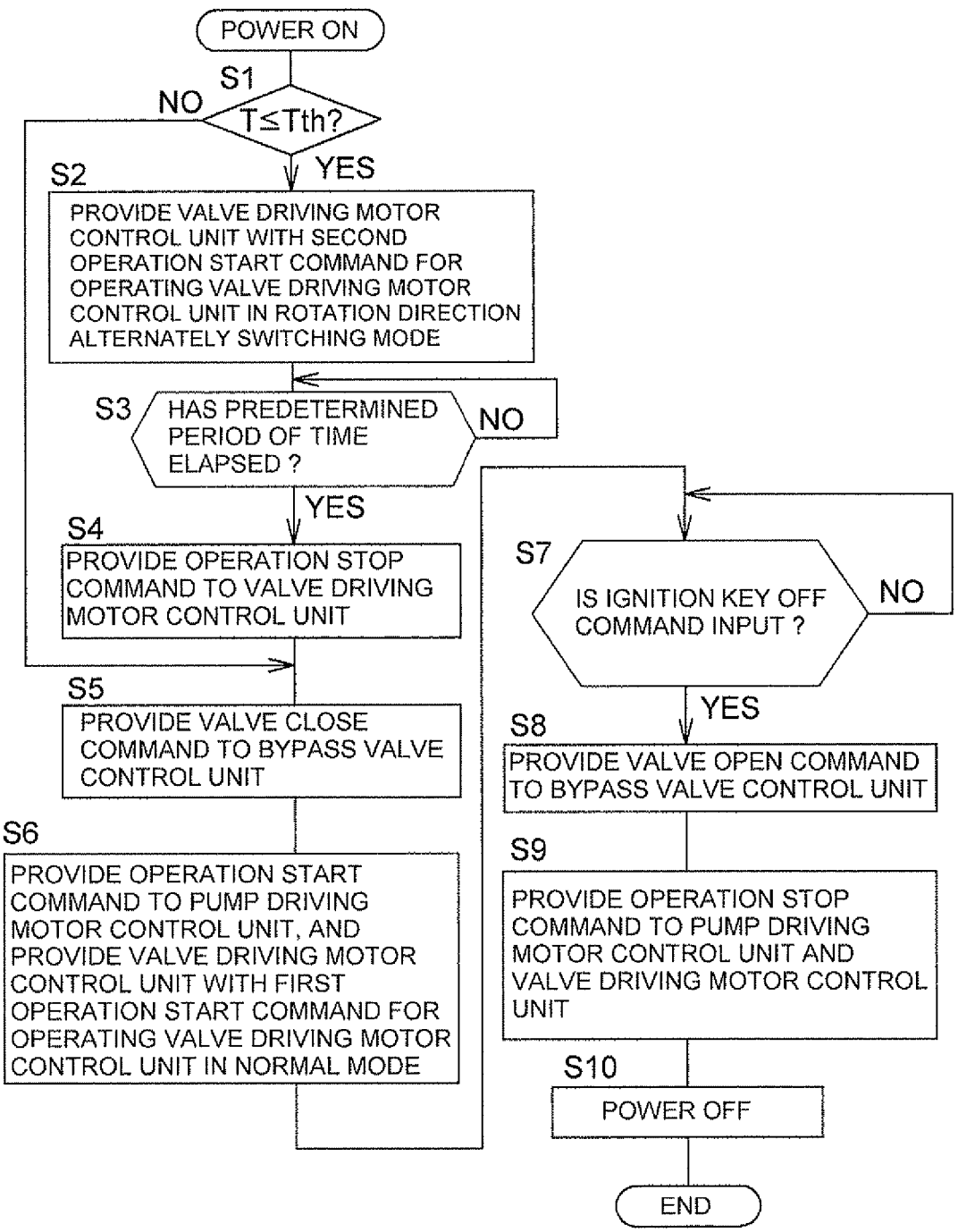
FIG. 8 is a flowchart that shows an operation of an overall control unit.

FIG. 8 is a flowchart that shows an operation of the overall control unit 51. When the ECU 40 is powered on by turning on an ignition key (not shown), the overall control unit 51 determines whether the temperature detected by the temperature sensor 36 (hereinafter, referred to as "detected temperature T") is lower than or equal to a predetermined temperature Tth (step S1). The predetermined temperature Tth is set to, for example, −10° C. At the time when the ECU 40 is powered on, the bypass valve control unit 52, the valve driving motor control unit 53 and the pump driving motor control unit 54 are not operating. Therefore, the bypass valve 27 is open, and the valve driving motor 15 and the pump driving motor 25 are not driven.

When it is determined that the detected temperature T is higher than the predetermined temperature Tth (NO in step S1), the overall control unit 51 proceeds to step S5 in order to execute the process (processes in steps S5, S6) for starting normal valve and pump control. In step S5, the overall control unit 51 provides a valve close command to the bypass valve control unit 52. When the bypass valve control unit 52 receives the valve close command from the overall control unit 51, the bypass valve control unit 52 energizes the solenoid 27a of the bypass valve 27. As a result, the bypass valve 27 is closed.

After that, the overall control unit 51 provides an operation start command to the pump driving motor control unit 54, and provides a first operation start command for operating the valve driving motor control unit 53 in the normal mode to the valve driving motor control unit 53 (step S6). When the pump driving motor control unit 54 receives the operation start command from the overall control unit 51, the pump driving motor control unit 54 starts control operation. Specifically, various portions in the pump driving motor control unit 54 are activated. Thus, the pump driving motor 25 is controlled on the basis of the steering angle θh (steering angular velocity ωh).

When the valve driving motor control unit 53 receives the first operation start command from the overall control unit 51, the valve driving motor control unit 53 starts operating in the normal mode. Specifically, after the command value selection unit 64 is controlled such that the first valve opening degree command value θB1* that is set by the valve opening degree command value setting unit 62 is selected, various portions in the valve driving motor control unit 53, except the rotation direction alternately switching mode command value generation unit 63, are activated. Thus, the assist torque command value TA* that corresponds to the steering torque Th and the vehicle speed V is set by the assist torque command value setting unit 61, and the first valve opening degree command value θB1* that corresponds to the assist torque command value TA* is set by the valve opening degree command value setting unit 62. The valve driving motor 15 is controlled on the basis of the first valve opening degree command value θB1* set by the valve opening degree command value setting unit 62. Note that, at this time, the rotation direction alternately switching mode command value generation unit 63 may be activated.

In this way, the normal valve and pump control is started. That is, in a state where the bypass valve 27 is closed, the pump driving motor 25 is driven and the valve driving motor 15 is driven in the normal control mode. When it is determined in step S1 that the detected temperature T is lower than or equal to the predetermined temperature Tth (YES in step S1), the overall control unit 51 proceeds to step S2 in order to increase the temperature of the hydraulic fluid in the hydraulic control valve 14 before executing the process (processes in steps S5, S6) for starting the normal valve and pump control.

In step S2, the overall control unit 51 provides a second operation start command for operating the valve driving motor control unit 53 in the rotation direction alternately switching mode to the valve driving motor control unit 53. When the valve driving motor control unit 53 receives the second operation start command from the overall control unit 51, the valve driving motor control unit 53 starts operating in the rotation direction alternately switching mode. Specifically, after the command value selection unit 64 is controlled such that the second valve opening degree command value θB2* that is generated by the rotation direction alternately switching mode command value generation unit 63 is selected, various portions in the valve driving motor control unit 53, except the assist torque command value setting unit 61 and the valve opening degree command value setting unit 62, are activated. Thus, the second valve opening degree command value θB2* is generated by the rotation direction alternately switching mode command value generation unit 63, and the valve driving motor 15 is controlled on the basis of the generated second valve opening degree command value θB2*. As a result, the valve driving motor 15 is rotated alternately in the forward direction and the reverse direction. Note that, at this time, the assist torque command value setting unit 61 and the valve opening degree command value setting unit 62 may be activated.

In this way, when the valve driving motor 15 is rotated alternately in the forward direction and the reverse direction for a predetermined period of time, the temperature of the hydraulic fluid in the hydraulic control valve 14 increases due to frictional heat. Thus, the viscosity of the hydraulic fluid and the friction resistance of an oil seal are reduced. In addition, in this case, the pump driving motor 25 is stopped. Therefore, it is possible to prevent movement of the piston 17 of the power cylinder 14 (rack shaft 7) due to alternate rotation of the valve driving motor 15 in the forward direction and the reverse direction. Furthermore, in this case, because the bypass valve 27 is open, it is possible to further reliably prevent movement of the piston 17 of the power cylinder 14.

After the process of step S4 is executed, the overall control unit 51 proceeds to step S5 in order to execute the process (processes in steps S5, S6) for starting the normal valve and pump control. When the overall control unit 51 executes the processes in steps S5, S6, the normal valve and pump control is started. That is, in a state where the bypass valve 27 is closed, the pump driving motor 25 is driven, and the valve driving motor 15 is driven in the normal control mode.

In a state where the normal valve and pump control is executed, when an ignition key off command that indicates that the ignition key is turned off is input into the overall control unit 51 (YES in step S7), the overall control unit 51 provides a valve open command to the bypass valve control unit 52 (step S8). When the bypass valve control unit 52 receives the valve open command from the overall control unit 51, the bypass valve control unit 52 stops energizing the solenoid 27a of the bypass valve 27. As a result, the bypass valve 27 is opened.

The overall control unit 51 provides an operation stop command to the pump driving motor control unit 54 and the valve driving motor control unit 53 (step S9). When the pump driving motor control unit 54 and the valve driving motor control unit 53 receive the operation stop command from the overall control unit 51, the pump driving motor control unit 54 and the valve driving motor control unit 53 stop the operations. After that, the overall control unit 51 turns off the power (step S10). Thus, the process that is executed by the overall control unit 51 ends.

As described above, in the present embodiment, when the detected temperature T is lower than or equal to the predetermined temperature Tth at the time when the ignition key is turned on (the ECU 40 is powered on), the valve driving motor 15 is rotated alternately in the forward direction and the reverse direction for the predetermined period of time. Thus, the temperature of the hydraulic fluid in the hydraulic control valve 14 increases due to frictional heat, and therefore the viscosity of hydraulic fluid and the friction resistance of an oil seal are reduced. After that, the normal valve and pump control is started. Therefore, after the normal valve and pump control is started, it is possible to prevent reduction in response of the hydraulic control valve 14 to the opening degree control due to insufficient motor torque of the valve driving motor 15. As a result, it is possible to improve the steering feel.

As described above, when the valve driving motor 15 is rotated alternately in the forward direction and the reverse direction, the pump driving motor 25 is stopped. Therefore, it is possible to prevent movement of the piston 17 of the power cylinder 16 due to alternate rotation of the valve driving motor 15 in the forward direction and the reverse direction. Furthermore, when the valve driving motor 15 is rotated alternately in the forward direction and the reverse direction, the bypass valve 27 is open. Therefore, it is possible to further reliably prevent movement of the piston 17 of the power cylinder 16 due to alternate rotation of the valve driving motor 15 in the forward direction and the reverse direction.

The embodiment of the invention is described above. However, the invention may be implemented in various other embodiments. For example, in the above-described embodiment, when the valve driving motor control unit 53 is operated in the rotation direction alternately switching mode, the pump driving motor 25 is stopped and the bypass valve 27 is open. Alternatively, when the valve driving motor control unit 53 is operated in the rotation direction alternately switching mode, if the pump driving motor 25 is stopped, the bypass valve 27 may be closed. On the other hand, when the valve driving motor control unit 53 is operated in the rotation direction alternately switching mode, if the bypass valve 27 is open, the pump driving motor 25 may be driven.

In the above-described embodiment, when the ignition key is turned on (the ECU 40 is powered on), it is determined whether the detected temperature T is lower than or equal to the predetermined temperature Tth. When the detected temperature T is lower than or equal to the predetermined temperature Tth, the valve driving motor control unit 53 is operated in the rotation direction alternately switching mode. Alternatively, the following configuration may be employed. That is, when the valve driving motor 15 is stopped for a predetermined period of time or longer after the normal valve and pump control is started, it is determined whether the detected temperature T is lower than or equal to the predetermined temperature Tth. When the detected temperature T is lower than or equal to the predetermined temperature Tth, the valve driving motor control unit 53 is operated in the rotation direction alternately switching mode for a predetermined period of time. In this case, when the valve driving motor control unit 53 is operated in the rotation direction alternately switching mode, in order to prevent movement of the piston 17 of the power cylinder 16 due to alternate rotation of the valve driving motor 15 in the forward direction and the reverse direction, it is desirable that the pump driving motor 25 be stopped or the bypass valve 27 be opened. Further, the following configuration may be employed. That is, when the valve driving motor control unit 53 is operated in the rotation direction alternately switching mode, the pump driving motor 25 is stopped and the bypass valve 27 is opened.

What is claimed is:

1. A hydraulic power steering system that generates steering assist force by supplying hydraulic fluid from a hydraulic pump to a power cylinder, which is coupled to a steering mechanism of a vehicle, via a hydraulic control valve that is not mechanically coupled to a steering member, comprising:

a valve driving motor that is used to control an opening degree of the hydraulic control valve;

temperature detecting means for detecting an ambient temperature of the hydraulic control valve; and alternate rotation driving means for rotating the valve driving motor alternately in a forward direction and a reverse direction for a predetermined period of time when the temperature detected by the temperature detecting means is lower than or equal to a predetermined value.

2. The hydraulic power steering system according to claim 1, further comprising:

a pump driving motor that is used to drive the hydraulic pump; and stopping means for stopping the pump driving motor when the valve driving motor is rotated alternately in the forward direction and the reverse direction by the alternate rotation driving means.

3. The hydraulic power steering system according to claim 1, further comprising:

two cylinder chambers that are formed inside the power cylinder and that are defined by a piston provided on a steered shaft;

two fluid passages that connect the respective cylinder chambers to the hydraulic control valve;

a bypass passage that is used to connect the two fluid passages to each other;

a bypass valve that is provided on the bypass passage; and opening means for opening the bypass valve when the valve driving motor is rotated alternately in the forward direction and the reverse direction by the alternate rotation driving means.

4. The hydraulic power steering system according to claim 1, wherein the alternate rotation driving means includes:

determination means for determining whether the temperature detected by the temperature detecting means is lower than or equal to the predetermined value when an ignition key is turned on; and driving means for rotating the valve driving motor alternately in the forward direction and the reverse direction for the predetermined period of time when it is determined by the determination means that the detected temperature is lower than or equal to the predetermined value.

* * * * *